(12) United States Patent
John et al.

(10) Patent No.: US 10,993,112 B2
(45) Date of Patent: *Apr. 27, 2021

(54) SYSTEMS AND METHODS FOR ACCESSING A NETWORK

(71) Applicant: Futurewei Technologies, Inc., Plano, TX (US)

(72) Inventors: Kaippallimalil Mathew John, Carrollton, TX (US); Weisheng Jin, Shenzhen (CN); Wenruo Zhu, Shanghai (CN)

(73) Assignee: Futurewei Technologies, Inc., Plano, TX (US)

(*) Notice: Subject to any disclaimer, the term of this patent is extended or adjusted under 35 U.S.C. 154(b) by 90 days.

This patent is subject to a terminal disclaimer.

(21) Appl. No.: 16/172,233

(22) Filed: Oct. 26, 2018

(65) Prior Publication Data

US 2019/0069182 A1    Feb. 28, 2019

Related U.S. Application Data

(62) Division of application No. 14/146,107, filed on Jan. 2, 2014, now Pat. No. 10,117,100.

(Continued)

(51) Int. Cl.
*H04W 12/08* (2021.01)
*H04W 36/00* (2009.01)
(Continued)

(52) U.S. Cl.
CPC .......... *H04W 12/08* (2013.01); *H04L 63/162* (2013.01); *H04W 12/0017* (2019.01);
(Continued)

(58) Field of Classification Search
CPC ...... H04L 63/08; H04L 63/162; H04W 12/06; H04W 12/08; H04W 40/02; H04W 76/02; H04W 76/11; H04W 76/15; H04W 76/16
(Continued)

(56) References Cited

U.S. PATENT DOCUMENTS 5,838,261 A   11/1998 Lauta et al.
7,350,077 B2   3/2008 Meier et al.
(Continued)

FOREIGN PATENT DOCUMENTS

CN   101742496 A   6/2010
JP   2015536586 A   12/2015
(Continued)

OTHER PUBLICATIONS

"3rd Generation Partnership Project; Technical Specification Group Services and System Aspects; Study on S2a Mobility Based on GTP & WLAN Access to EPC (SaMOG); Stage 2, (Release 12)," 3GPP TR 23.852, V1.3.0, Nov. 2012, 123 pages.
(Continued)

*Primary Examiner* — Harun Chowdhury
(74) *Attorney, Agent, or Firm* — Slater Matsil, LLP

(57)    ABSTRACT

System and method embodiments are provided for accessing a wireless network. The embodiments enable establishing and releasing session resources in a wireless local area network (WLAN) corresponding to packet data network (PDN) connections in a 3 GPP enhanced packet core (EPC). In an embodiment, a method in a network component for establishing a control channel with a user equipment (UE) includes setting up, by the network component, a link layer channel, sending, by the network component, an identifier of the link layer channel to the UE; and communicating, by the network component, with the UE over the link layer channel using a WLAN control protocol (WLCP), wherein the
(Continued)

Figure 1:
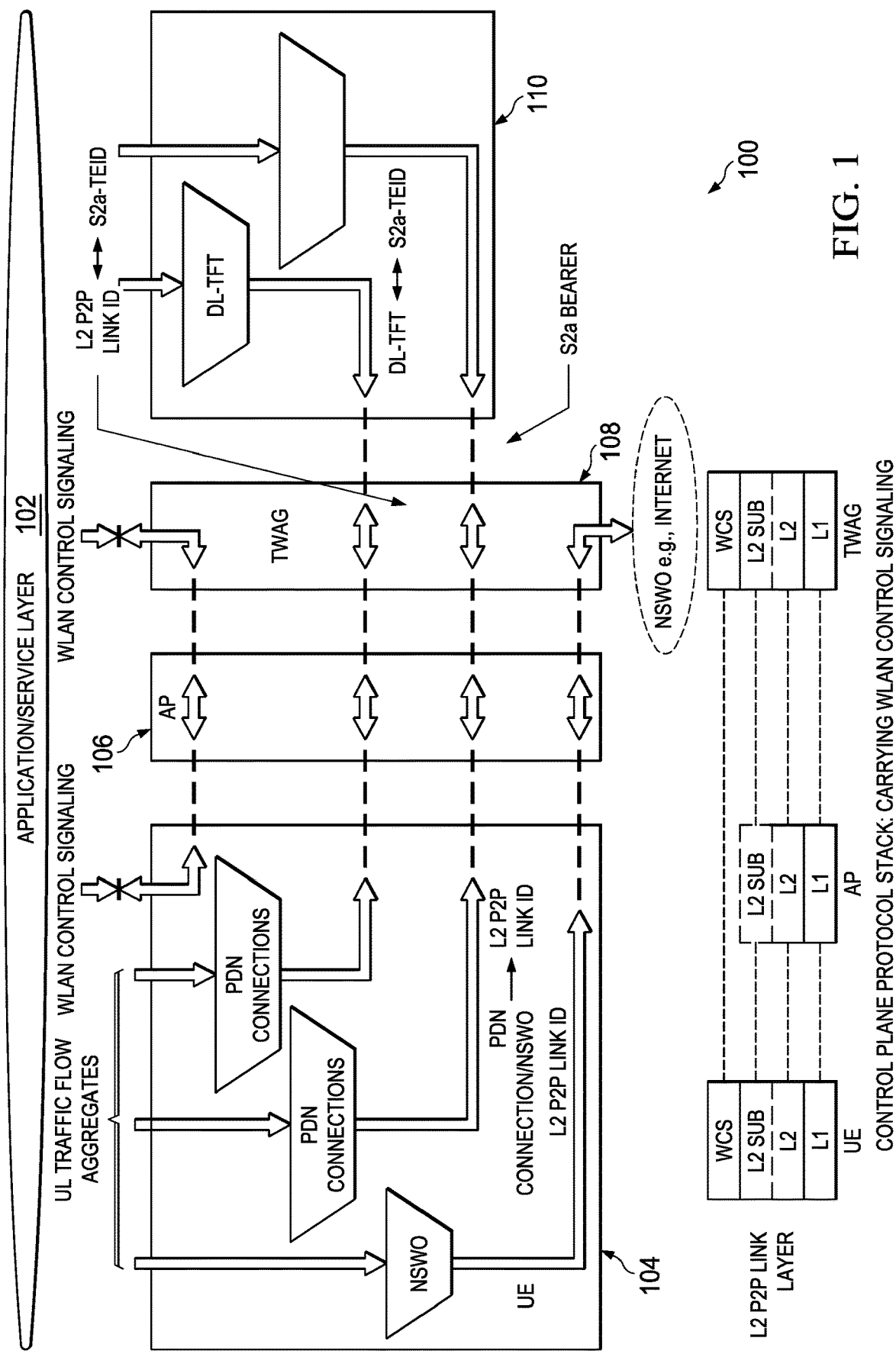

WLAN comprises a trusted WLAN Access Network (TWAN).

32 Claims, 12 Drawing Sheets

Related U.S. Application Data

(60) Provisional application No. 61/748,662, filed on Jan. 3, 2013.

(51) Int. Cl.
| | |
|---|---|
| H04L 29/06 | (2006.01) |
| H04W 12/06 | (2021.01) |
| H04W 76/15 | (2018.01) |
| H04W 76/11 | (2018.01) |
| H04W 12/00 | (2021.01) |
| H04W 84/04 | (2009.01) |
| H04W 84/12 | (2009.01) |

(52) U.S. Cl.
CPC ....... *H04W 12/06* (2013.01); *H04W 36/0027* (2013.01); *H04W 76/11* (2018.02); *H04W 76/15* (2018.02); *H04W 84/042* (2013.01); *H04W 84/12* (2013.01)

(58) Field of Classification Search
USPC .................................. 370/254, 329, 331, 338
See application file for complete search history.

(56) References Cited

U.S. PATENT DOCUMENTS

| | | | |
|---|---|---|---|
| 2004/0066769 A1 | 4/2004 | Ahmavaara et al. | |
| 2004/0103282 A1 | 5/2004 | Meier et al. | |
| 2006/0190721 A1* | 8/2006 | Kawakami | H04L 63/08 713/161 |
| 2009/0270102 A1 | 10/2009 | Liu et al. | |
| 2011/0149928 A1 | 6/2011 | Wu et al. | |
| 2011/0176486 A1 | 7/2011 | Mahdi | |
| 2011/0225284 A1 | 9/2011 | Savolainen | |
| 2011/0225632 A1 | 9/2011 | Ropolyi et al. | |
| 2011/0255510 A1 | 10/2011 | Rydnell et al. | |
| 2011/0283344 A1 | 11/2011 | Krishnan et al. | |
| 2011/0296518 A1 | 12/2011 | Faynberg et al. | |
| 2012/0272310 A1 | 10/2012 | Souissi et al. | |
| 2014/0036807 A1 | 2/2014 | Huang et al. | |
| 2014/0071969 A1* | 3/2014 | Roeland | H04W 76/16 370/338 |
| 2014/0086226 A1* | 3/2014 | Zhao | H04W 76/11 370/338 |
| 2014/0093071 A1 | 4/2014 | Qiang | |

FOREIGN PATENT DOCUMENTS

| | | |
|---|---|---|
| KR | 20090112039 A | 10/2009 |
| RU | 2304856 C2 | 8/2007 |
| WO | 2010076044 A1 | 7/2010 |
| WO | 2014047545 A2 | 3/2014 |
| WO | 2014056983 A1 | 4/2014 |

OTHER PUBLICATIONS

"3rd Generation Partnership Project; Technical Specification Group Services and System Aspects; Study on S2a Mobility based On GTP & WLAN Access to EPC (SaMOG); Stage 2 (Release 12)," 3GPP TR 23.852, V1.3.0, 122 pages.

"3rd Generation Partnership Project; Technical Specification Group Services and System Aspects; Architecture Enhancements for Non-3GPP Accesses, (Release 11)," 3GPP TS 23.402, V11.5.0, Dec. 2012, 252 pages.

"3rd Generation Partnership Project; Technical Specification Group Services and System Aspects; Architecture enhancements for non-3GPP accesses," (Release 12), Technical Specification, 3GPP TS 23.402, V12.2.0, Sep. 2013, 256 pages.

"3rd Generation Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG)," Stage 2, Release 12, Technical Report, 3GPP TR 23.852 V12.0.0, Sep. 2013, 157 pages.

Aekko, J. et al., "Extensible Authentication Protocol Method for 3rd Generation Authentication and Key Agreement EAP-AKA)," The Internet Society, Jan. 2006, 80 pages.

Huawei, et al., "SaMOG Phase 2 APN/PDN Signalling" 3GPP TSG SA WG2 Meeting #94, TD S2-124845 (revision of S2-124767), Nov. 12-16, 2012, 12 pages.

Ericsson, et al."Proposal for a SaMOG Phase 2 Solution," 3GPP TSG SA WG2 Meeting #92, TD S2-122712, Jul. 9-13, 2012, 6 pages.

* cited by examiner

SYSTEMS AND METHODS FOR ACCESSING A NETWORK

CROSS-REFERENCE TO RELATED APPLICATIONS

The present application is a divisional of U.S. patent application Ser. No. 14/146,107 filed Jan. 2, 2014 entitled "Systems and Methods for Accessing a Network," which claims the benefit of U.S. Provisional Patent Application No. 61/748,662 filed Jan. 3, 2013 entitled "System and Method for Accessing a Network," all of which applications are hereby incorporated herein by reference as if reproduced in their entireties.

TECHNICAL FIELD

The present invention relates to a system and method for wireless communications, and, in particular embodiments, to a system and method for accessing a network.

BACKGROUND

In 3GPP S2a networks such as wireless local area networks (WLAN), there is no signaling mechanism between a user equipment (UE) and an access gateway (e.g., trusted WLAN access gateway (TWAG)) to enable signaling of packet data network (PDN) connection and network session aspects including access point name (APN), handover, etc. Because there are no UE changes supported currently, the UE can only send Internet protocol (IP) layer requests or, for IPv6, wait for the default router/gateway to supply an IP prefix/address as configuration.

SUMMARY

In accordance with an embodiment, a method in a network component for establishing a control channel with a user equipment (UE) includes setting up, by the network component, a link layer channel with the UE; sending, by the network component, an identifier of the link layer channel to the UE; and communicating, by the network component, with the UE over the link layer channel using a wireless local area network (WLAN) control protocol (WLCP), wherein the WLAN comprises a trusted WLAN Access Network (TWAN).

In accordance with an embodiment, a network component for establishing a control channel with a user equipment (UE) includes a processor and a computer readable storage medium storing programming for execution by the processor, the programming including instructions to: set up a link layer channel with the UE, send an identifier of the link layer channel to the UE; and communicate with the UE over the link layer channel using a wireless local area network (WLAN) control protocol (WLCP), wherein the WLAN comprises a trusted WLAN Access Network (TWAN).

In accordance with an embodiment, a method in a user equipment (UE) of establishing a control channel for multi-packet data network (PDN) access with a wireless network component includes obtaining, by a UE, a UE identifier; setting up by the UE, with the wireless network component a PDN connection; obtaining, by the UE, a wireless network component identifier of the wireless network component; and communicating, by the UE, with the wireless network component over an internet protocol (IP) layer channel using wireless local area network (WLAN) control protocol (WLCP).

In accordance with an embodiment, a user equipment (UE) for establishing a control channel for multi-packet data network (PDN) access with a wireless network component includes a processor and a computer readable storage medium storing programming for execution by the processor, the programming including instructions to: obtain a UE identifier; set up a PDN connection with the wireless network component; obtain a wireless network component identifier of the wireless network component; and communicate with the wireless network component over an internet protocol (IP) layer channel using wireless local area network (WLAN) control protocol (WLCP).

BRIEF DESCRIPTION OF THE DRAWINGS

For a more complete understanding of the present invention, and the advantages thereof, reference is now made to the following descriptions taken in conjunction with the accompanying drawing, in which:

FIG. 1 illustrates an embodiment architecture for control signaling over a L2 path;

FIG. 2 illustrates an embodiment system showing the functional entities that cooperate to signal using WCS protocol (WLCP);

FIG. 3 illustrates a first procedure of EAP authentication;

FIGS. 4A & 4B illustrate an embodiment method for the configuration of the WLCP protocol channel during UE authentication, or WLCP Channel—L2 P2P Link ID configuration;

FIGS. 5A & 5B illustrate an embodiment method of a sequence of steps that allows a UE in a N3GPP network to attach to the set of networks/APNs;

FIG. 6 illustrates an embodiment method for a UE in a N3GPP network to release a connection or detach;

FIG. 7 illustrates an embodiment method for control signaling over L3;

FIGS. 8A & 8B illustrate an embodiment method for WLCP over L3; and

FIG. 9 illustrates a computing platform that may be used for implementing, for example, the devices and methods described herein, in accordance with an embodiment.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In 3GPP SaMOG study phase 1, APN and PDN connections are implicitly agreed based on a service set identification (SSID) selected during authentication, configuration downloaded during authorization in a user profile, etc. This implicit arrangement is not sufficient when multiple PDN connections in the 3GPP enhanced packet core (EPC) need to be signaled in the WLAN access network between the UE and the first hop router (trusted WLAN access gateway (TWAG) in 3GPP) for a single authorized network session. And even for a single PDN connection there is value to explicit signaling, in that it can avoid configuration errors and configuration based assumptions.

In an embodiment, as used herein, in a trusted WLAN, there are at least two relationships—one between the WLAN provider and the 3GPP EPC provider and one between the UE and the 3GPP EPC provider. In an untrusted case, there is a relationship between the UE and the 3GPP EPC provider and one between the UE and the WLAN provider. The lack of a trust relationship between the WLAN and the EPC provider is referred to as untrusted, while in a trusted relationship, where the UE and the WLAN both have a trust relationship with the 3GPP EPC provider, the WLAN network is a trusted proxy network.

An embodiment provides WLAN control signaling for a multi-PDN access connection (i.e., multi-connection mode). Embodiments provide solutions based on WLAN control signaling (WCS) protocol (WLCP) to allow a UE to connect to a specific network (e.g., APN), and provide complete attach/detach and handover sequences. As used herein, the terms WCS and WLCP are sometimes used interchangeably.

An embodiment sets up a control channel for layer 2 protocol-WLCP for establishing and releasing session resources in a WLAN network corresponding to PDN connections in the 3GPP EPC (Enhanced Packet Core). Various embodiments provide three mechanisms by which the media access control (MAC) address of the WLCP Server (TWAG) is provided to the UE.

For configuration/bootstrapping of the WLCP MAC address to the UE, the current proposal is to use broadcast, which may be inefficient. Various embodiments provide three methods: multicast, initial configuration or extensible authentication protocol (EAP) extension-based configuration. The configuration of the control channel for WLCP using EAP extensions is more efficient and complete in terms of configuration. Embodiments may be implemented in WLAN networks attached to 3GPP EPC, and the like.

An embodiment Layer 2 (L2) mechanism for WLCP sets up a control channel for a layer 2 protocol—WLCP for establishing and releasing session resources in a WLAN network corresponding to PDN connections in 3GPP EPC.

An embodiment WLCP supports initial attach, handover and connection release for PDN connections. The WLCP allows exchange of the following parameters. First, UE—network: APN/Non-Seamless WLAN Offload (NSWO) indication, Protocol Configuration Options (PCO) and Request Type (initial/handover). Second, network—UE: L2 Point-to-Point Link Identifier, and may also include APN, PCO, or UE's IP address. Third, other parameters such as IMSI, NAI, UE's MAC address or other identity of UE in the network.

This allows the UE to use WLCP to configure resources in WLAN corresponding to multiple PDN connections in the 3GPP EPC. In order to bootstrap the WLCP, the following are handled. First, a link layer channel is set up over which the UE and gateway (TWAG) can communicate using WLCP. The link layer channel may be a specific virtual local area network (VLAN), generic routing encapsulation (GRE), sub-network access protocol (SNAP) header or other. The value of this WLCP transport channel is sent to the UE. Second, a mechanism allows the UE to determine the MAC address of the gateway (TWAG) for the first WLCP message from UE to gateway (TWAG).

A specific MAC address could also be allocated to the UE and itself used as the WLCP transport channel. In this case, another link layer channel is not necessary. Each UE can be allocated a different MAC address used for WLCP transport channel or some UEs could share a same MAC address, and the network differentiates the UEs together with the UE ID.

In an embodiment, a method in a network component for establishing a control channel with a user equipment (UE) includes sending, by the network component, an identifier of a link layer channel to the UE and communicating, by the network component, with the UE over the link layer channel using a wireless local area network (WLAN) control protocol (WLCP). The method may also include receiving a request for multi-connection mode from the UE. Additionally, the method may include receiving a WLCP a packet data network (PDN) connection request from the UE. In an embodiment, a MAC address of the TWAG is provided to the UE by using a dedicated Ethernet multicast address listened to by the TWAG. This may include the TWAG sending a WLCP Init indication when the UE has successfully authenticated. Providing the MAC address of the TWAG to the UE may also be accomplished by sending an address of the TWAG to the UE in an extensible authentication protocol (EAP) response.

In an embodiment, a network component, such as a TWAG, sends an identifier of the link layer channel to the UE comprises sending by an authentication, authorization and accounting (AAA) server/proxy an identifier of a link channel to the UE in an extensible authentication protocol (EAP) message. The EAP message may include an EAP request. In an embodiment, prior to sending the identifier of a link channel to the UE, the AAA server/proxy obtains the identifier of the link channel from a TWAG. The identifier of the link channel may include a media access control (MAC) address of one of a trusted WLAN access gateway (TWAG) and a Trusted WLAN Access Network (TWAN). In an embodiment, the identifier of the link channel may include an internet protocol (IP) address or an internet protocol (IP) address with port number of one of a trusted WLAN access gateway (TWAG) and a Trusted WLAN Access Network (TWAN).

In an embodiment, the UE communicates with a network component, such as a TWAG, over the link layer channel using a wireless local area network (WLAN) control protocol (WLCP). In an embodiment, this communication includes receiving a session management message from the UE over the link channel identified by the identifier received during an EAP procedure. This communication may also include sending a session management message to the UE after receiving the session management message from the UE. In an embodiment, the session management message includes at least one of a packet data network (PDN) connection management message, an attach message, a detach message, a handover message, and a Non-Seamless WLAN Offload (NSWO) establishing and release message.

In an embodiment, the communication between the UE and the TWAG includes sending an identifier used to identify a point-to-point link between the UE and a serving trusted WLAN access gateway (TWAG) that is associated to one of a specific packet data network (PDN) connection and a Non-Seamless WLAN Offload (NSWO) connection. In an embodiment, the identifier used to identify the point-to-point link between the UE and the TWAG includes a media access control (MAC) address of the TWAG. The MAC address of the TWAG may be used for encapsulating user plane packets transported between the UE and the TWAG for one of a PDN connection and a NSWO connection. In an embodiment, the TWAG uses a MAC address of the UE and the MAC address of the TWAG to identify the point-to-point link between the UE and the serving TWAG and match the point-to-point link with a tunnel to a PDN gateway (GW) or a gateway general packet radio service support node (GGSN) for the PDN connection.

In an embodiment, a method in a user equipment (UE) of establishing a control channel for multi-packet data network (PDN) access with a wireless network component includes obtaining, by a UE, a UE identifier; setting up by the UE, with the wireless network component a PDN connection; obtaining, by the UE, a wireless network component identifier of the wireless network component; and communicating, by the UE, with the wireless network component over an internet protocol (IP) layer channel using WLCP. The network component includes one of a trusted WLAN access gateway (TWAG) and a Trusted WLAN Access Network (TWAN). The UE identifier may include a UE IP address and the wireless network component identifier (e.g., TWAG identifier) may include an IP address of the wireless network component. In an embodiment, obtaining a wireless network component identifier includes receiving an identifier of a link channel between the UE and the network component. In an embodiment, receiving the identifier of the link channel between the UE and the network component includes receiving the identifier of the link channel in an extensible authentication protocol (EAP) message from an authentication, authorization and accounting (AAA) server/proxy. In an embodiment, the AAA server/proxy obtains the identifier of the link channel from a trusted WLAN access gateway (TWAG). Communicating, by the UE, with the wireless network component over an IP layer channel using WLCP may include sending a session management message over a link channel identified with the identifier received during an extensible authentication protocol (EAP) procedure. In an embodiment, sending the session management message includes sending a session management message to a media access control (MAC) address received by the UE during the EAP procedure.

In an embodiment, sending the session management message includes sending the session management message to an IP address or an IP address with port number received by the UE during the EAP procedure. In an embodiment, sending the session management message comprises sending a session management message to an IP address or an IP address with port number received during the EAP procedure as an IP layer destination address, and to a media access control (MAC) address received during EAP procedure as a MAC layer destination address. The session management message may include at least one of a PDN connection management message, an attach message, a detach message, a handover message, and a Non-Seamless WLAN Offload (NSWO) establishing and release message. In an embodiment, communicating, by the UE, with the wireless network component over an IP layer channel using WLCP comprises receiving an identifier used to identify a point-to-point link between the UE and a serving trusted WLAN access gateway (TWAG) that is associated to a specific PDN connection or Non-Seamless WLAN Offload (NSWO) connection and the identifier used to identify the point-to-point link between the UE and its serving TWAG may include a media access control (MAC) address of the TWAG. In an embodiment, the MAC address of the TWAG is used for encapsulating user plane packets transported between the UE and the TWAG for a PDN connection or an NSWO connection. In other embodiments, the specific value of any VLAN ID, L2 GRE key, SNAP header of the trusted WLAN Access Network (TWAN) can be used instead of or in addition to the MAC address to identify the point-to-point link between the UE and its serving TWAG. By using one of these other options other than the MAC address to identify the point-to-point link between the UE and its serving TWAG, the MAC address may also participate in identifying a link both for the WLCP and the PDN connection/NSWO connection.

FIG. 1 illustrates an embodiment architecture 100 for control signaling over a L2 path. The architecture 100 includes an application/service layer 102, a user equipment (UE), a wireless access point (AP) 106, a TWAG 108, and a PDN gateway (GW) 110. Wireless AP and TWAG are the components of Trusted WLAN Access Network (TWAN). The L2 P2P link ID includes: VLAN ID, MAC address, keyed GRE over Ethernet, new 3GPP specific LLC/SNAP header, and the like. In an embodiment, a specific VLAN ID, keyed GRE over Ethernet, or LLC/SNAP header can also be an identifier for the user plane separating PDN/NSWO connections. The UE 104 includes PDN connections and an NSWO connection and supports WLAN control signaling with the TWAG 108. A control plane protocol stack carries the WLAN control signaling. In an embodiment, the architecture 100 may also support control signaling over a L3 path. However, although the WLCP message is encapsulated by an IP header (with a specific destination IP address or allocated by the TWLAN), the L3 header may not be routable. Therefore, it may be preferable to use the L2 path to carry the message with the IP header as the indicator of the WLCP message. The UE can use any address including a self-allocated address as the source address of the message packet to the TWAN.

Figure 2:
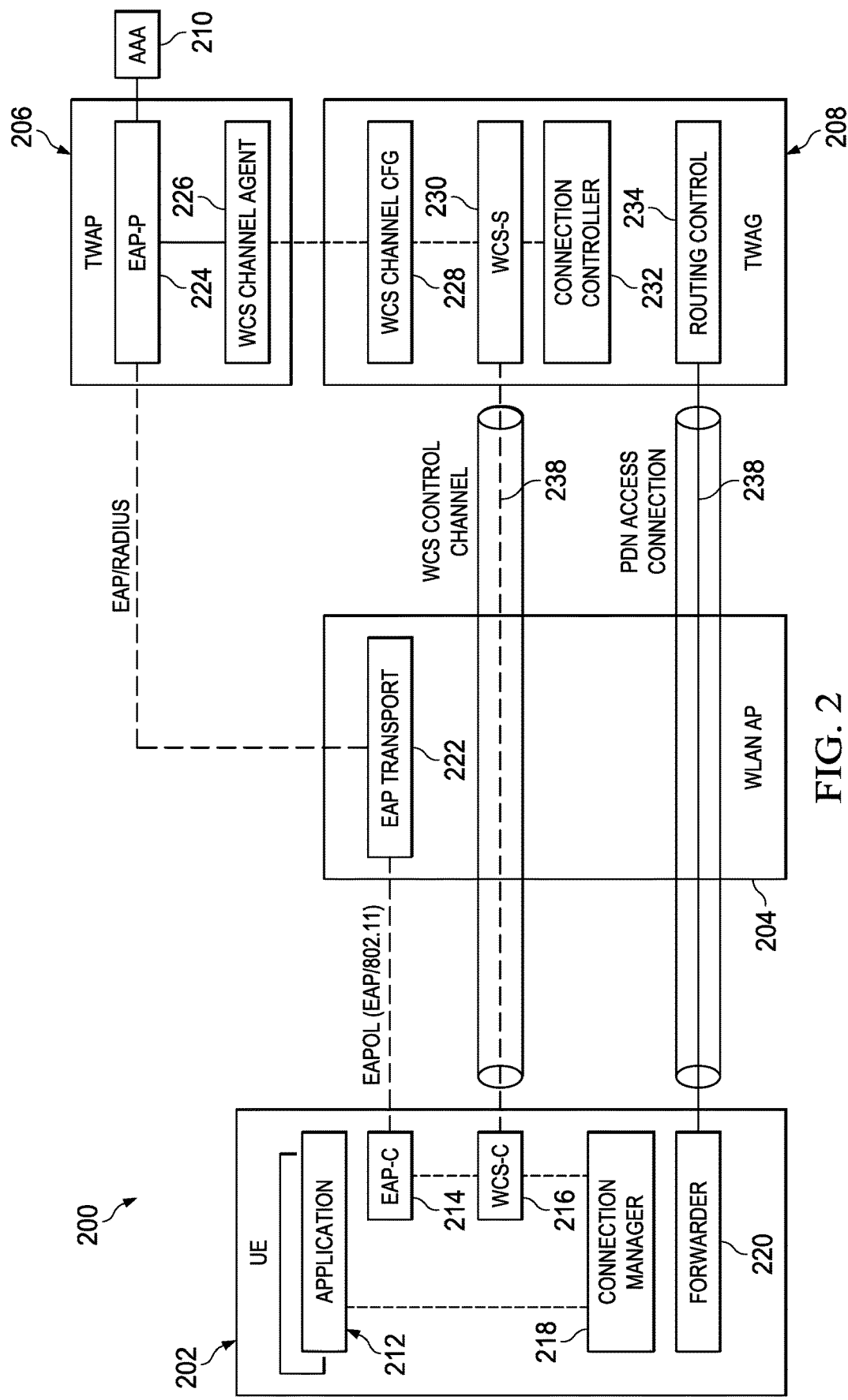

FIG. 2 illustrates an embodiment system 200 showing the functional entities that cooperate to signal using WLCP. The system 200 includes a UE 202, a WLAN AP 204, a trusted WLAN authentication, authorization, and accounting (AAA) proxy (TWAP) 206, a TWAG (208), and a AAA server/proxy 210. The UE includes application components 212, an EAP-client (EAP-C) 214, a WLCP-client (WCS-C) 216, a connection manager 218, and a forwarder 220. The WLAN AP 204 includes a EAP transport component 222. The TWAP 206 includes an EAP-proxy (EAP-P) component 224 and a WLCP-channel agent 226. The TWAG 208 includes a WLCP channel configuration component 228, a WLCP-server (WCS-S) component 230, a connection controller 232, and a routing controller 234. The WLCP channel configuration component 228 communicates with the WLCP channel agent 226. This communication may be direct or through intermediaries. The exact method of communication between the WLCP channel configuration component 228 and the WLCP channel agent 226 may vary between different embodiments.

The UE 202 has a WCS-C 216 that communicates with the WCS-S 230 in the gateway (TWAG) 208. The application 212 triggered by the user causes the connection manager 218 to start WLCP signaling. Prior to using WLCP 238, WLCP 238 is configured. In this embodiment, the EAP and authentication, authorization and accounting (AAA) protocol ((remote authentication dial in user service (RADIUS)/Diameter) are used to exchange this information.

A high level sequence of operation is as follows. During the UE 202 authentication sequence using, e.g., EAP-AKA', if the UE 202 signals (or is capable of) multi-PDN setup, then the WCS-CHANNEL-AGENT 226 in TWAP 206 requests the WCS-CHANNEL-CFG (configurator) 228 to return a suitable layer 2 point-to-point link specifically for control channel signaling. This is referred to as WCS control channel (WCC) 238 herein. TWAP 224 obtains the WCC 238 and sends this to the AAA server 210 as a RADIUS/Diameter parameter.

When the AAA server 210 receives an EAP-AKA' authentication sequence from the UE 202 where the UE 202 signals that it is capable of multi-PDN setup, and the TWAP 224 sends the WCC in Diameter/RADIUS, the AAA responds to UE 210 with the WCC 238 as an EAP extension parameter. The EAP Client 214 in the UE 202 receives this parameter and sends it to the WCS-C 216 for use in subsequent WLCP 238 messages.

The UE 202 obtains the MAC address of the TWAG 208 either as an EAP extension parameter (similar to the WLCP channel), or the TWAG 208 sends an Init in the WLCP channel 238 for the UE 202 to discover the MAC address. When TWAP 206 receives EAP Success (for the UE 202 authentication), the WCS-CHANNEL-AGENT 226 sends a notification to TWAG 208 (WCS-CHANNEL-CFG 228) to commit the WCC ID (L2 P2P Link ID). If the TWAG. While the EAP-AKA' authentication method is described in an embodiment, in other embodiments, EAP-AKA, EAP-SIM, and the like may be used as well.

Figure 3:
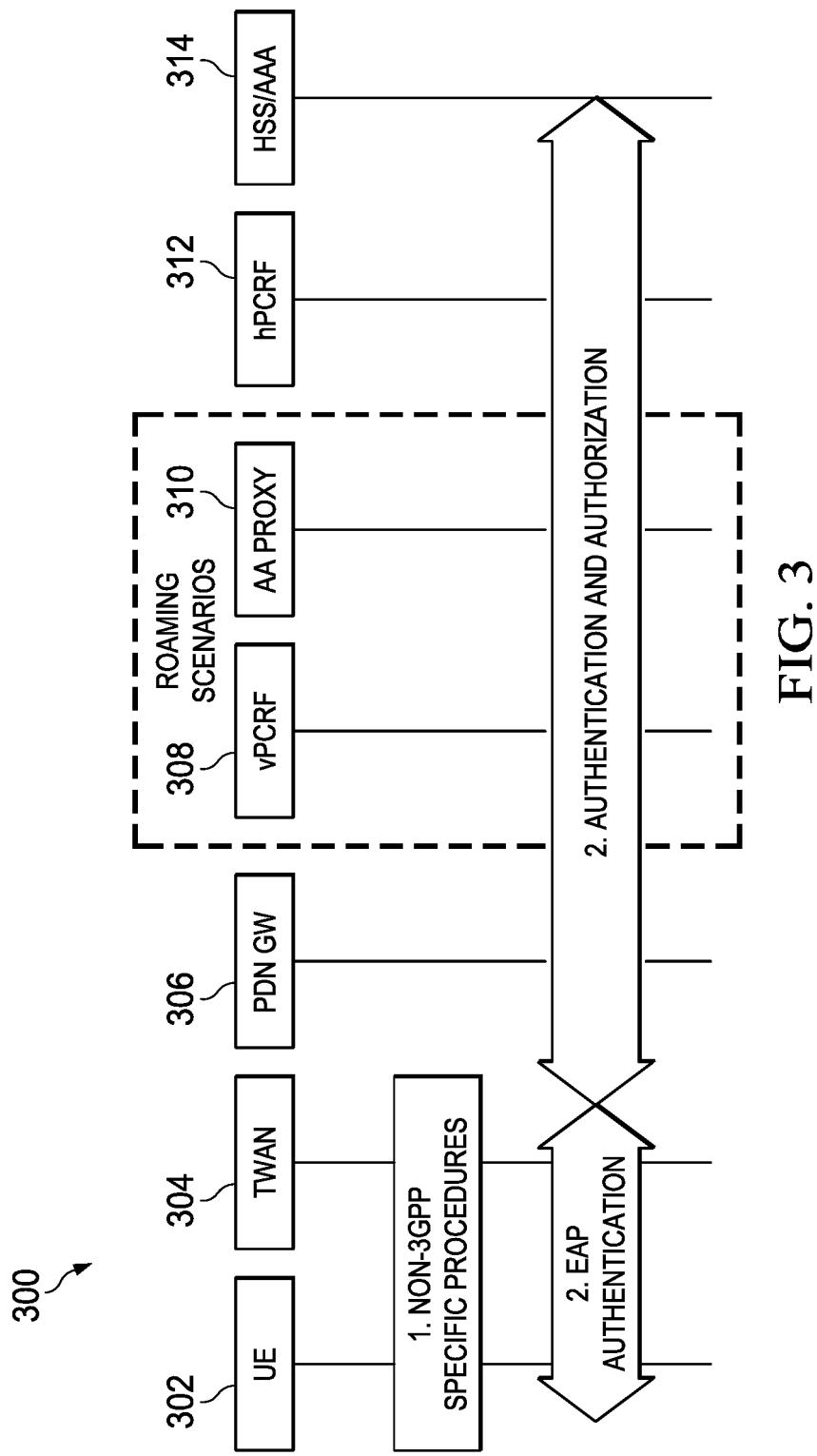

FIG. 3 illustrates a first procedure 300 of EAP authentication. In EAP authentication, the network sends the server address (e.g., domain name, IP address, IP address with port number, etc.) or L2 P2P link ID used for WLAN Control Signaling to the UE 302, which may happen in initial attach to WLAN, and handover to WLAN. L2 P2P link of WLAN Control Signaling could be used for L2 P2P link of user plane or L3 P2P tunnel of user plane. The L2 P2P link of user plane or L3 P2P tunnel of user plane is used for PDN connection or NSWO separate of the UE 302. After the UE 302 receives the IP address (e.g., NSWO IP address), the UE may connect to the server of WLAN control signaling and communicate with the server for PDN connection establishment, release, or detach. Other procedures for control signaling over L3 or similar to control signaling for L2.

Figure 4A:
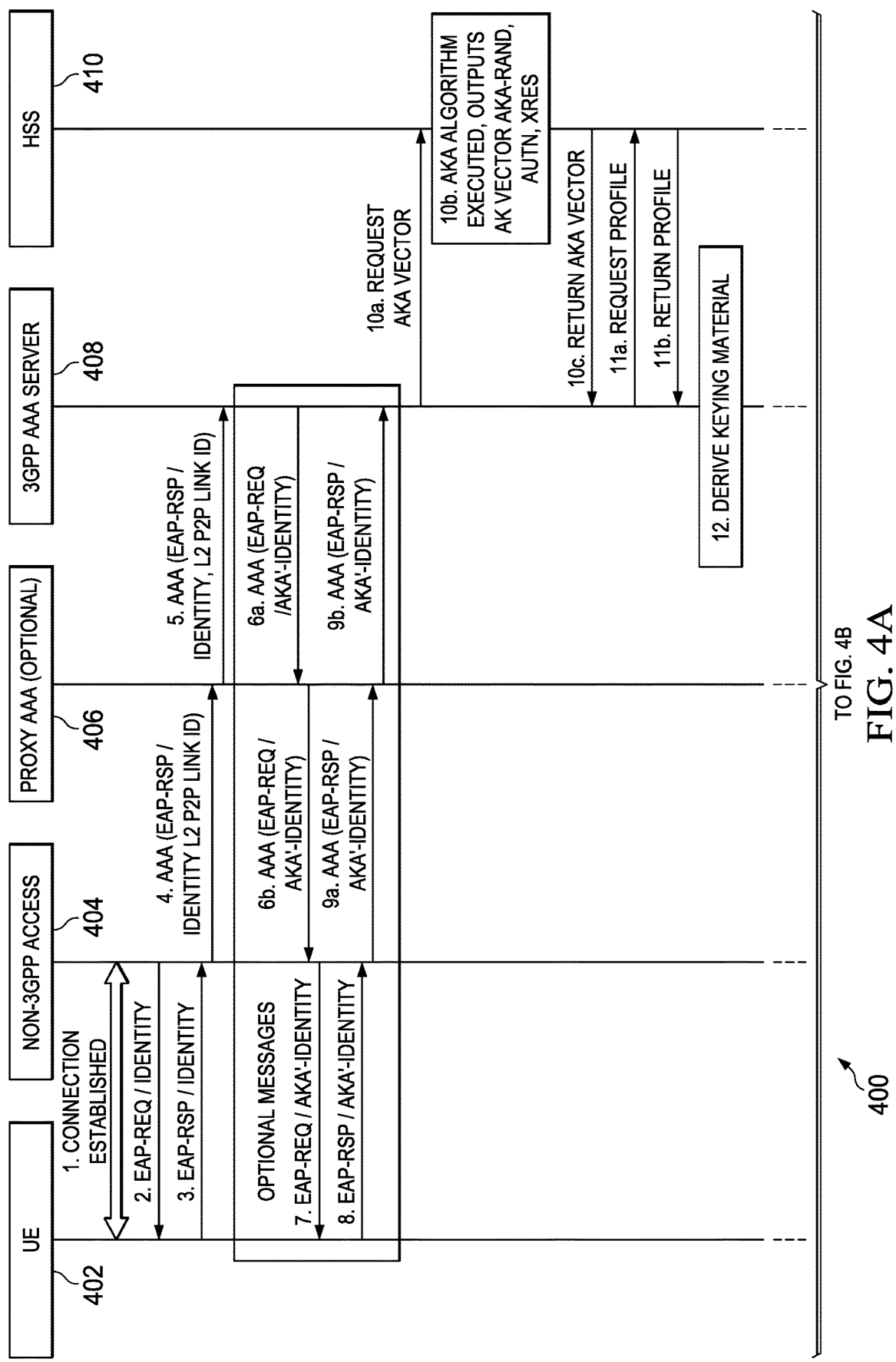
Figure 4B:
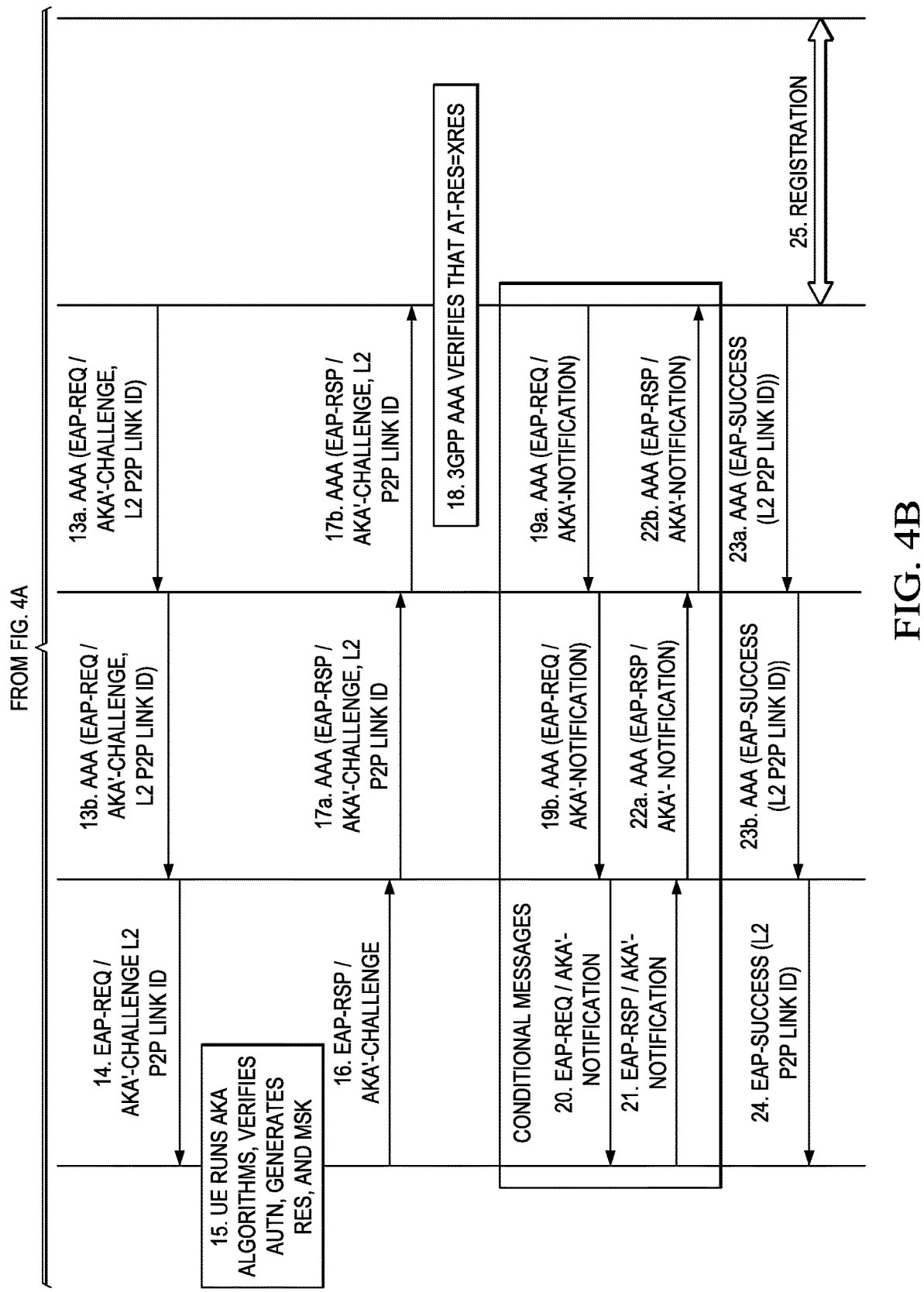

With respect to the WLCP Channel (L2 P2P Link ID) bootstrap flow sequence, FIGS. 4A & 4B illustrate an embodiment method 400 for the configuration of the WLCP channel during UE authentication, or WLCP Channel—L2 P2P Link ID configuration. The WLCP control channel is identified in FIGS. 4A & 4B as "L2 P2P link ID" (Layer 2 Point-to-Point link identifier). The L2 P2P Link may be based on VLAN, L2 GRE, SNAP header, specific MAC or another mechanism. The L2 P2P link ID of WLCP may be sent from the non-3GPP access 404 (TWAG, trusted WLAN AAA proxy (TWAP)) to AAA proxy 406 and AAA server 408 in steps 4, 5 (as a parameter of EAP RSP or AAA signaling) and sent from the AAA proxy 406 and AAA server 408 to the UE 402 in step 13a, 13b, 14 (as a parameter of EAP-REQ). The AAA proxy 406 is optional in some embodiments.

Alternatively, the L2 P2P link ID of WLCP may be sent from the non-3GPP access 404 (TWAG, TWAP) to AAA server 408 in steps 17a, 17b, (as a parameter of EAP RSP or AAA signaling) and sent from the AAA server 408 to the UE 402 in step 23a, 23b, 24 (as a parameter of EAP-Success). In this alternative, EAP Success would need to be extended to be able to carry parameters. The L2 P2P link ID configuration (control channel configuration) is valid only when UE 402 authentication is successful.

In FIGS. 4A & 4B, L2 P2P link ID as the identifier of a link layer channel of WLAN Control Signaling may be sent from the non-3GPP access (TWAG) to AAA in step 4, step 5 (as a parameter of EAP RSP- or AAA signaling) and sent from the AAA to the UE in step 13a, step 13b, step 14 (as a parameter of EAP-REQ). Or, L2 P2P link ID of WLAN Control Signaling may be sent from the non-3GPP access (TWAG) to AAA in step 17a, step 17b (as a parameter of EAP RSP- or AAA signaling) and sent from the AAA to the UE in step 23a, step 23b, step 24 (as a parameter of EAP-Success). But it is not a restriction, that is to say, as long as the AAA server obtains the L2 P2P link ID of WLAN Control Signaling, the AAA server can send the P2P link ID to the UE in any steps available. The EAP-Success may be extended to be able to carry parameters. When the UE gets the L2 P2P link ID of WLAN Control Signaling in either way, the UE only uses it when the authentication is successful.

With respect to TWAG Discovery/Configuration, in addition to a channel to communicate the WLCP, it may be necessary for the UE 402 to discover the TWAG. There are a number of options by which the UE 402 determines the TWAG MAC address. First, multicast the initial request from the UE 402. This may require the pre-configuration as a well-known address or assignment of an Ethernet multicast address from the Ethernet multicast address space to be efficient (compared to broadcast).

Second, WLCP Server in (TWAN) (e.g., non-3GPP access 404) initiates the WLCP signaling by sending an Init to the UE 402. In this alternative, the TWAP, on receipt of EAP-Success from AAA server 408, sends an indication to the WLCP server (TWAG) (e.g., non-3GPP access 404). The WLCP server in (TWAN) (e.g., non-3GPP access 404) uses this indication/information of EAP-Success to trigger a WLCP Init message—sent from the same MAC address that it expects to receive WLCP messages from the UE 402.

Third, provide the WLCP Server (TWAG) (e.g., non-3GPP access 404) MAC in EAP-AKA Response message. In this case, the WLCP Server (TWAG) (e.g., non-3GPP access 404) provides the MAC address (in similar manner as WLCP channel id) to the TWAP. The TWAP sends this MAC address to AAA server 408 which then adds this as an EAP extension parameter (RFC 4187) and sends in an EAP Response to the UE 402.

Figure 5A:
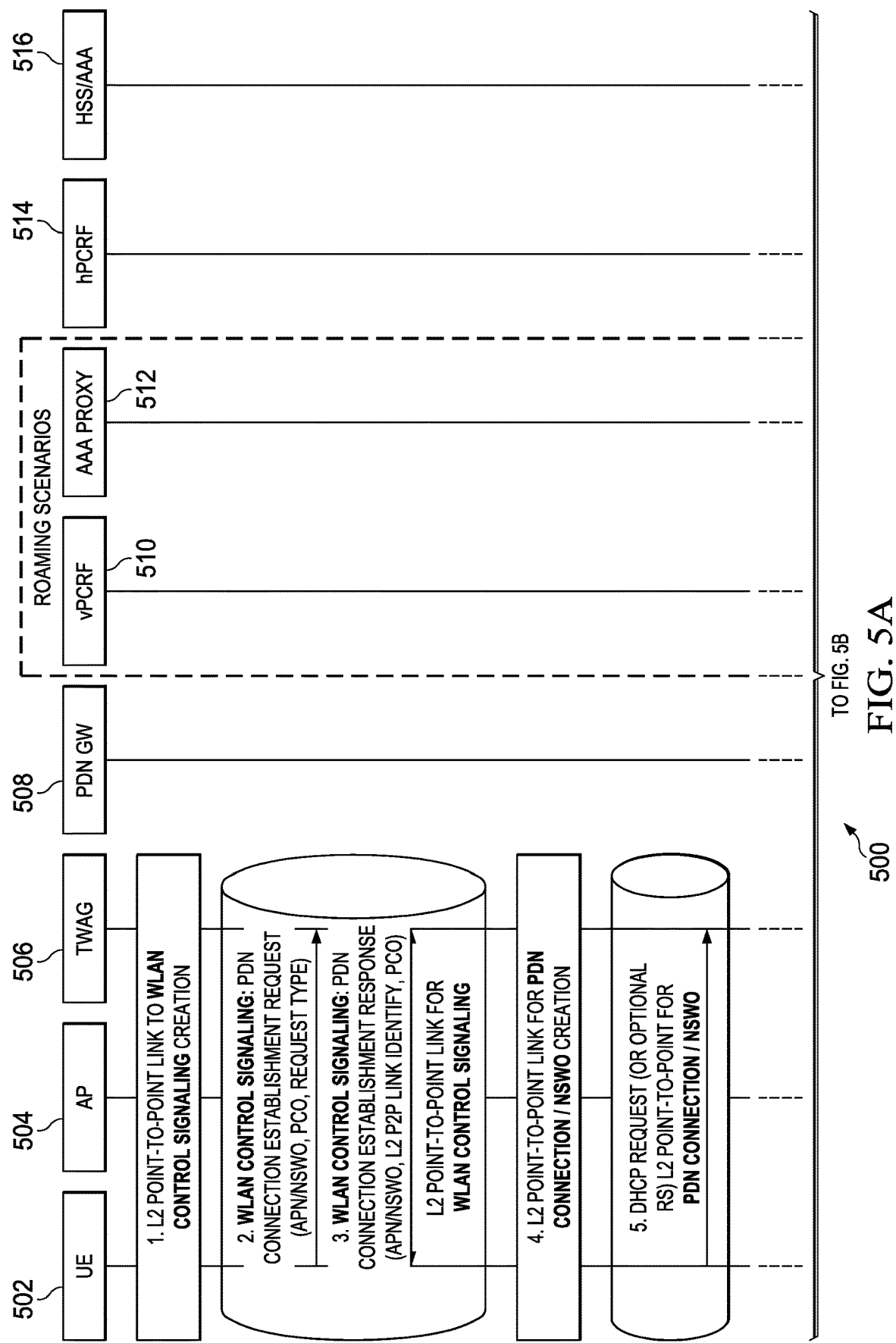
Figure 5B:
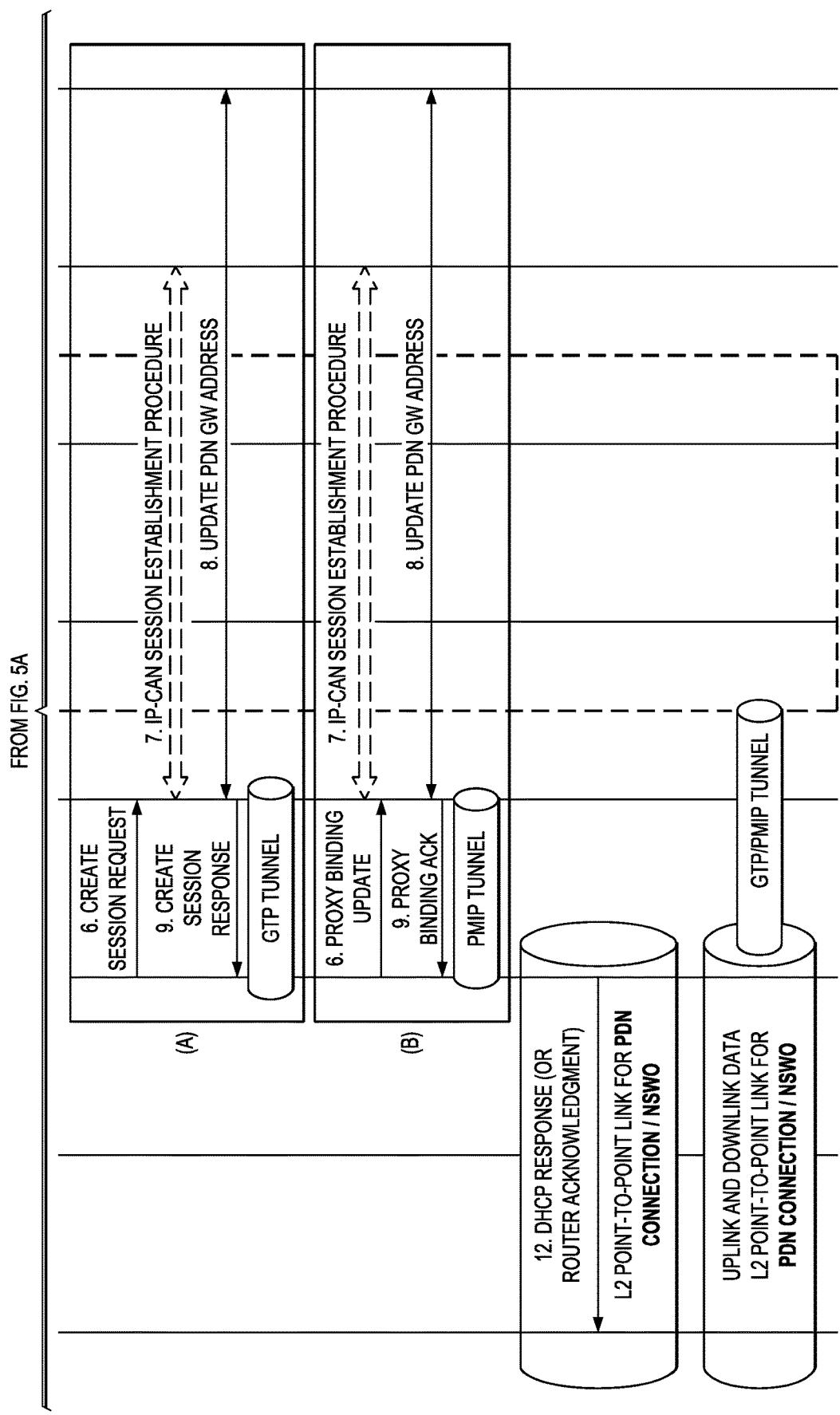

With respect to the initial attach/handover/connection establishment flow sequence, FIGS. 5A & 5B illustrate an embodiment method 500 of a sequence of steps that allows a UE 502 in a non-3GPP N3GPP network to attach to the set of networks/APNs. A N3GPP network is an access network that does not use technologies defined in 3GPP, such as, for example, WLAN, WiMAX, etc.

In PDN connection establishment or NSWO, the UE 502 uses the L2 P2P link for WLAN Control Signaling to communicate PDN connection parameter with the network. The parameters sent by UE 502 include APN/NSWO indication, PCO, and Request Type. The parameters sent to the UE 502 include APN/NSWO indication, PCO, and L2 P2P link ID. The communication between the UE 502 and the network might include UE ID (IMSI, NAI or temporary ID of UE allocated by the network). Either Part A (for GTP based S2a) or Part B (for PMIP based S2a) is performed.

The following sequence of steps is used to configure a PDN access connection/NSWO in the WLAN. This may also happen after the UE's EAP authentication as described previously in initial attach or handover to S2a WLAN.

In step 1, the WLCP channel for the UE 502 is configured to communicate with the TWAG 506 (as described previously) via the AP 504. At the end of this configuration, the WLCP Client in the UE 502 has an L2 P2P ID (WLCP channel ID) to send the signaling messages to the TWAG 506.

In steps 2, 3, the UE 502-TWAG 506 set up a PDN connection or NSWO using APN (or other PDN ID)/NSWO, PCO, Request Type (Initial Request/Handover) and other signaling parameters. The conversation between the UE 502 and the TWAG 506 is over the WLCP channel (L2 P2P). The TWAG 506 responds with a P2P Link ID for the PDN Connection or NSWO being established. Subsequent user plane IP layer signaling/data can be sent over this established P2P Link for the PDN Connection or NSWO. The Request Type indicates "initial request" if the UE requests new additional PDN connectivity, the Request Type indicates "handover" when the UE 502 is performing a handover from other access and the UE 502 has already established connectivity with the PDN over the access.

If the UE's PDN IP address is allocated by the network in step 3, then step 5 and step 10 might not be performed and steps 6-9 of Part A or Part B are performed between step 2 and step 3.

The UE 502 sends in the newly created P2P Link an IP configuration request in step 5 (IPv4 DHCP Request or IPv6 Router Solicitation if needed). In steps 6-9, the TWAG 506 interacts with the PDN GW to configure the corresponding GTP/PMIP segment of the PDN connection in 3GPP EPC (Enhanced Packet Core). Either Part A (for GTP based interface between TWAG 506 and PDN GW 508) or Part B (for PMIP based) is performed. For IPv6, Router Solicitation is optional and thus, step 6 is triggered as a result of completion of step 4 (completion of creating the P2P link for the PDN connection).

In step 10, the TWAG 506 configures the IP address/prefix over the P2P link established for this PDN connection. At this point, the UE 502 can send/receive traffic for this PDN connection. The UE 502 can repeat the sequence above (steps 2-10) for establishing another PDN connection. For handovers, the same sequence as above is used except that the Request Type is set to handover.

For UE 502 indicating NSWO in step 2, steps 6-9 is not performed, and the data packet directly goes through the TWAG 506 between the UE 502 and the internet via the L2 P2P Link established in step 4. It should be noted that the P2P link established in steps 2-3 for a PDN connection between the UE 502 and the TWAG 506 could be a tunnel over IP.

Figure 6:
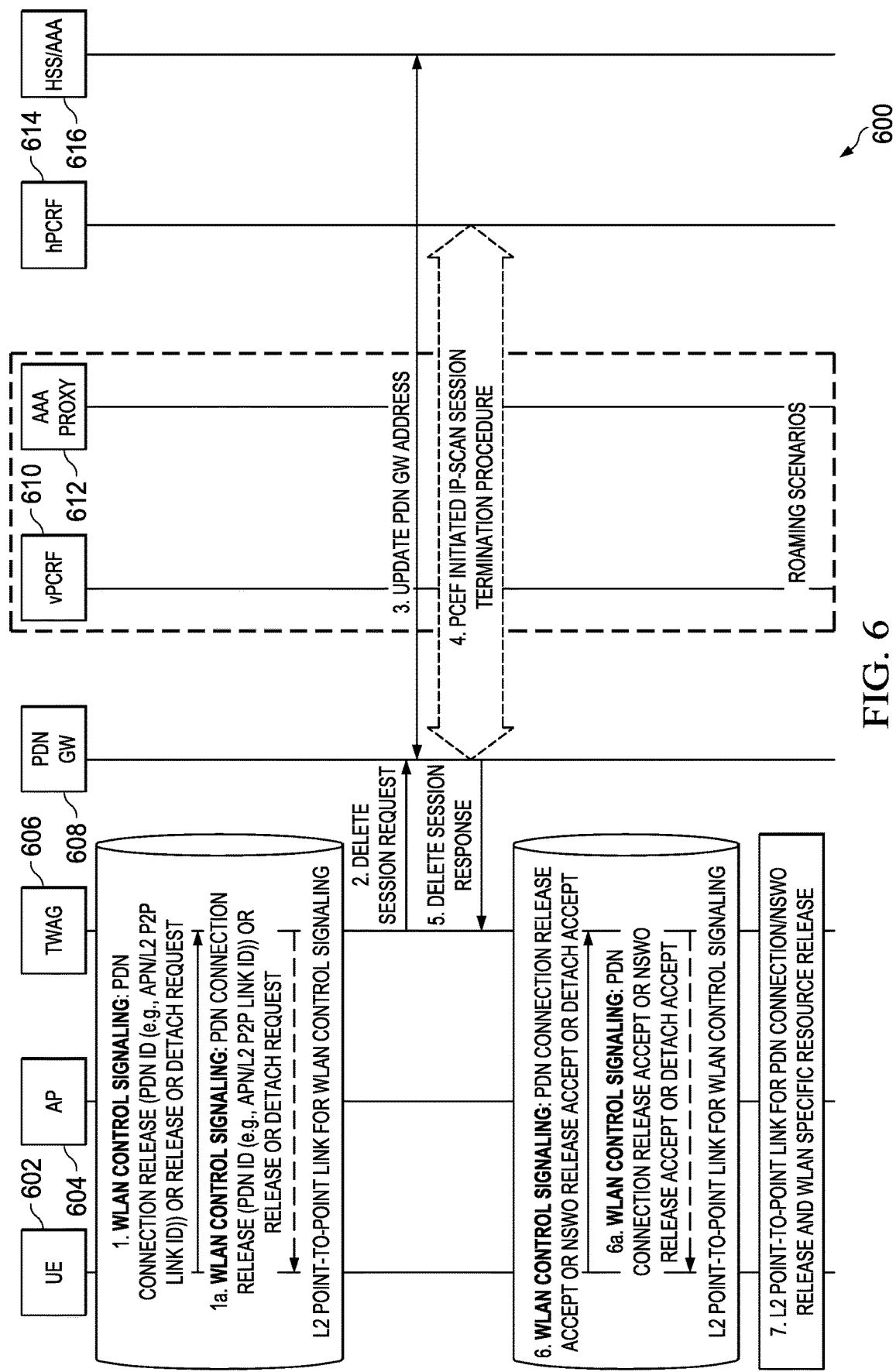

With respect to connection release and detach flow sequence, FIG. 6 illustrates an embodiment method 600 for a UE in a N3GPP network to release a connection or detach. In an embodiment, unless otherwise stated, UE 602, AP 604, TWAG 606, PDN GW 608, visited Policy and Charging Rule Function (vPCRF) 610, AAA Proxy 612, home Policy and Charging Rule Function (hPCRF) 614, and home subscriber server (HSS)/AAA 616 may be similar to similar components and function in a similar manner to similar components described in FIGS. 5A & 5B. The vPCRF 610 and the hPCRF 614 are used for center control of QoS and charging policy. The AAA proxy is used in the roaming case to forward authentication messages between the UE and the AAA server (in home network) in visited network. The HSS stores user subscriber data in the home network and may send the data to the AAA server when requested. The following sequence of steps is used to release a PDN access connection or detach completely.

In step 1, the UE 602 initiates connection release (PDN connection or NSWO) or detach by sending this request (APN (PDN ID)/NSWO/detach) over the L2 P2P Link configured for WLCP of the UE 602 through AP 604 to TWAG 606. Alternatively, the network TWAG 606 may initiate connection release (PDN connection or NSWO) or detach in step 1a.

For PDN connection release or detach, the TWAG 606 initiates release mechanisms in the 3GPP EPC (steps 2-5). For NSWO release, the steps 2-5 are not performed.

In step 6, the TWAG 606 response step 1 to the UE 602 for the release. Or in the step 6a, the UE 602 response step 1a to the TWAG 606. The network may implicitly detach a UE 602, if it has not had communication with UE for a long period of time. The network (TWAG 606) does not send the detach request (Detach Type) message to the UE 602 for implicit detach.

In step 7, the L2 P2P Link for PDN connection(s)/NSWO are released. Subsequently, the WLAN specific resource could also be released. For detach, the L2 P2P link configured for WLCP of the UE 602 is released in this step. The L2 P2P link resource (including ID resource) may be used for other UE 602 after PDN connection release or NSWO release or detach of a UE 602.

Step 1 and step 6 are UE 602 initiated PDN connection release or detach. Step 1a and step 6a are network initiated PDN connection release or detach. The network may implicitly detach a UE 602, if it has not had communication with UE 602 for a long period of time. The network (TWAG 606) does not send the Detach Request (Detach Type) message to the UE 602 for implicit detach.

The PDN ID might include APN, L2 P2P link ID, and temporary session ID of the PDN connection or NSWO allocated by the network or the UE 602.

Steps 2-5 are not performed for NSWO release. L2 P2P link resource (including ID) could be used for other UE 602 after PDN connection release or NWSO release or detach of a UE. Detach procedure over via Control Signaling over L2 path is optional.

Another embodiment utilizes a Layer 3 (L3) Protocol with Layer 3 based control channel signaling. Unlike L2 control channel signaling described previously, the IP address/domain name of the WLCP server is configured (instead of a L2 control channel). For a L3 control channel setup, the TWAP/TWAG returns the IP address/domain name of the WLCP server of the IP layer interface for the control channel signaling to the UE in authentication procedure similar as described above. The port of the WLCP server may also be sent to the UE with its IP address. And the WLCP server may be integrated in the TWAG. If not integrated, the WLCP server will have an interface with the TWAG to exchange necessary information.

Figure 7:
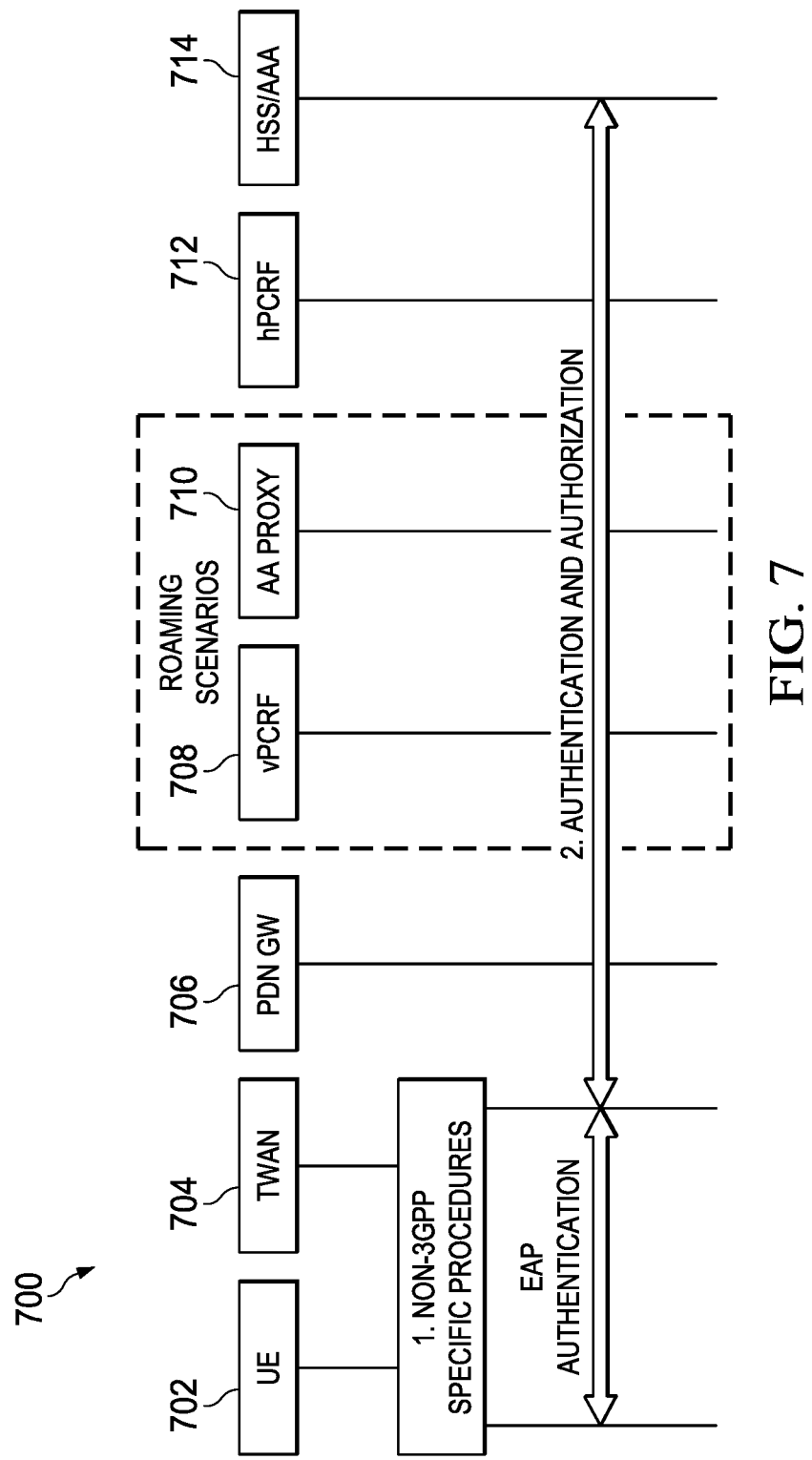

FIG. 7 illustrates an embodiment method 700 for control signaling over L3. In EAP authentication, the network sends the server address (domain name, IP address) used for WLAN Control Signaling to the UE 702, which may happen in initial attach to WLAN, or handover to WLAN. After the UE 702 gets an IP address (e.g., NSWO IP address), the UE 702 may connect to the Server of WLAN Control Signaling and communicate with the server in the TWAN for PDN connection establishment or release or detach. The rest of the procedure is similar to that described in the previous embodiment. In an embodiment, unless otherwise stated, UE 702, PDN GW 706, vPCRF 708, AAA Proxy 710, hPCRF 712, HSS/AAA 714 may be similar to and may function in a similar manner as similar components in FIG. 6.

Figure 8A:
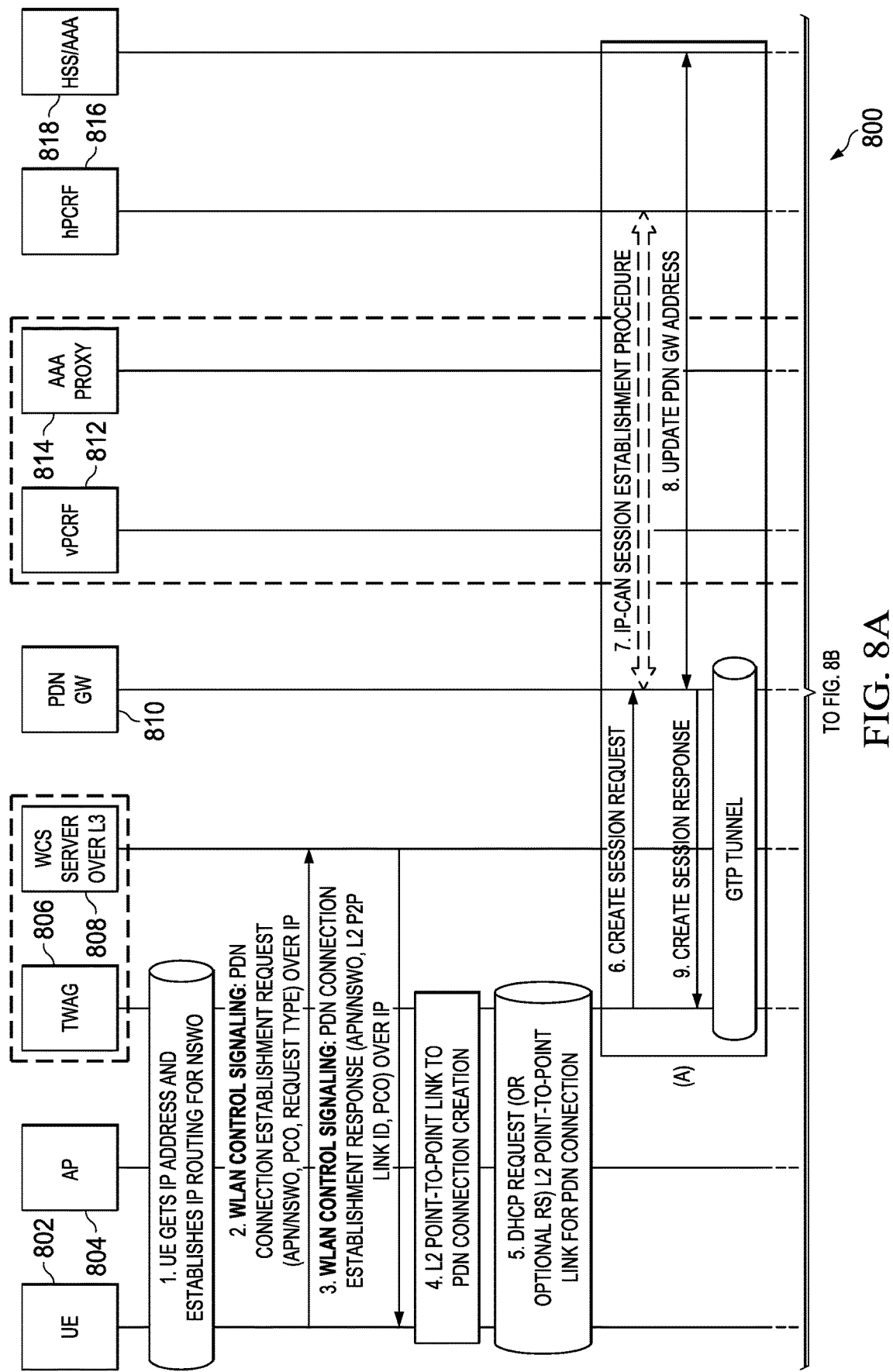
Figure 8B:
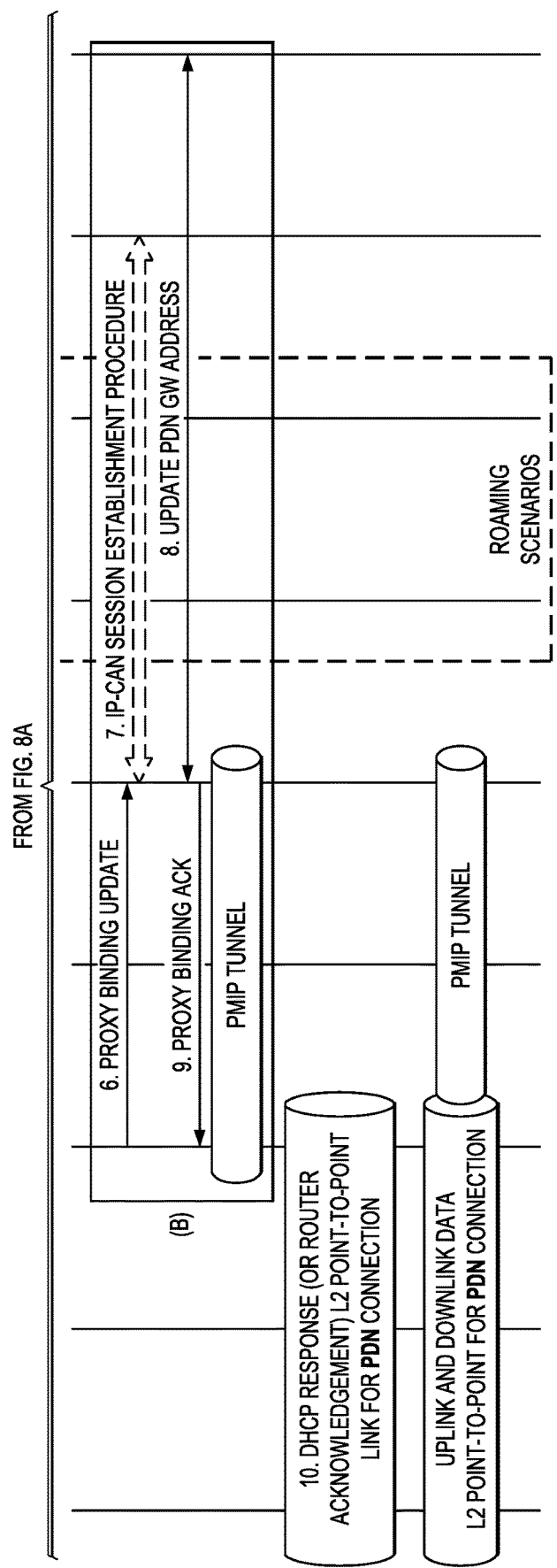

FIGS. 8A & 8B illustrate an embodiment method 800 for WLCP over L3. The following sequence of steps is used to configure a PDN access connection over L3 WLAN Control Signaling. This may also happen after the UE's EAP authentication as described previously in initial attach or handover to S2a WLAN. UE 802 communicates with TWAG 806 and other components via AP 804. In an embodiment, UE 802, AP 804, TWAG 806, WLCP server 808, PDN GW 810, vPCRF 812, AAA proxy 814, hPCRF 816, and HSS/AAA 818 may be similar to similar components in FIG. 7 and may function in a similar manner except as otherwise described.

In step 1, the UE 802 gets an IP address (usually for NSWO). The WLCP client in the UE 802 has L3 routing capability and could send the signaling messages to the WLCP server 808. In this step, the routing of UE's NSWO IP address may be constrained that the UE 802 only can access the WLCP server 808.

In steps 2, 3, the UE 802-TWAG 806 set up a PDN connection using APN (or other PDN ID), PCO, Request Type (Initial Request/Handover) and other signaling parameters. The address of the TWAG 806 (WLCP server 808) is obtained in authentication procedure as described above. If the UE 802 gets a domain name of WLCP server 808 in authentication procedure, before sending WLCP to the WLCP server 808, the UE 802 may obtain the IP address of WLCP server 808 via DNS query. The conversation between the UE 802 and the WLCP server 808 (TWAG 806) is over L3 and may be encryption and/or integration protected. The TWAG 806 responds with a P2P Link ID for the PDN Connection being established. Subsequent user plane IP layer signaling/data can be sent over this established P2P Link for the PDN Connection. The Request Type indicates "initial request" if the UE 802 requests new additional PDN connectivity, the Request Type indicates "handover" when the UE 802 is performing a handover from other access and the UE 802 has already established connectivity with the PDN over the access.

If the UE's PDN IP address is allocated by the network in step 3, the step 5 and step 10 might not be performed and steps 6-9 of Part A or Part B will be performed between step 2 and step 3.

The UE 802 sends in the newly created P2P Link an IP configuration request in step 5 (IPv4 DHCP Request or IPv6 Router Solicitation if needed).

In steps 6-9, the TWAG 806 interacts with the PDN GW 810 to configure the corresponding GTP/PMIP segment of the PDN connection in 3GPP EPC. Either Part A (for GTP based interface between TWAG 806 and PDN GW 810) or Part B (for PMIP based) is performed. For IPv6, Router Solicitation is optional and thus, step 6 is triggered as a result of completion of step 4 (completion of creating the P2P link for the PDN connection).

In step 10, the TWAG 806 configures the IP address/prefix over the P2P link established for this PDN connection. At this point, the UE 802 can send/receive traffic for this PDN connection.

The UE 802 can repeat the sequence provided above (steps 2-10) for establishing another PDN connection. For handovers, the same sequence as above is used except that the Request Type is set to handover. It should be noted that, in an embodiment, the P2P link established in steps 2-3 for a PDN connection between the UE 802 and the TWAG 806 could be a tunnel over IP.

The PDN connection release and detach flow sequence are similar to the procedure described above, except that the WLAN Control Signaling is over IP layer transport.

Figure 9:
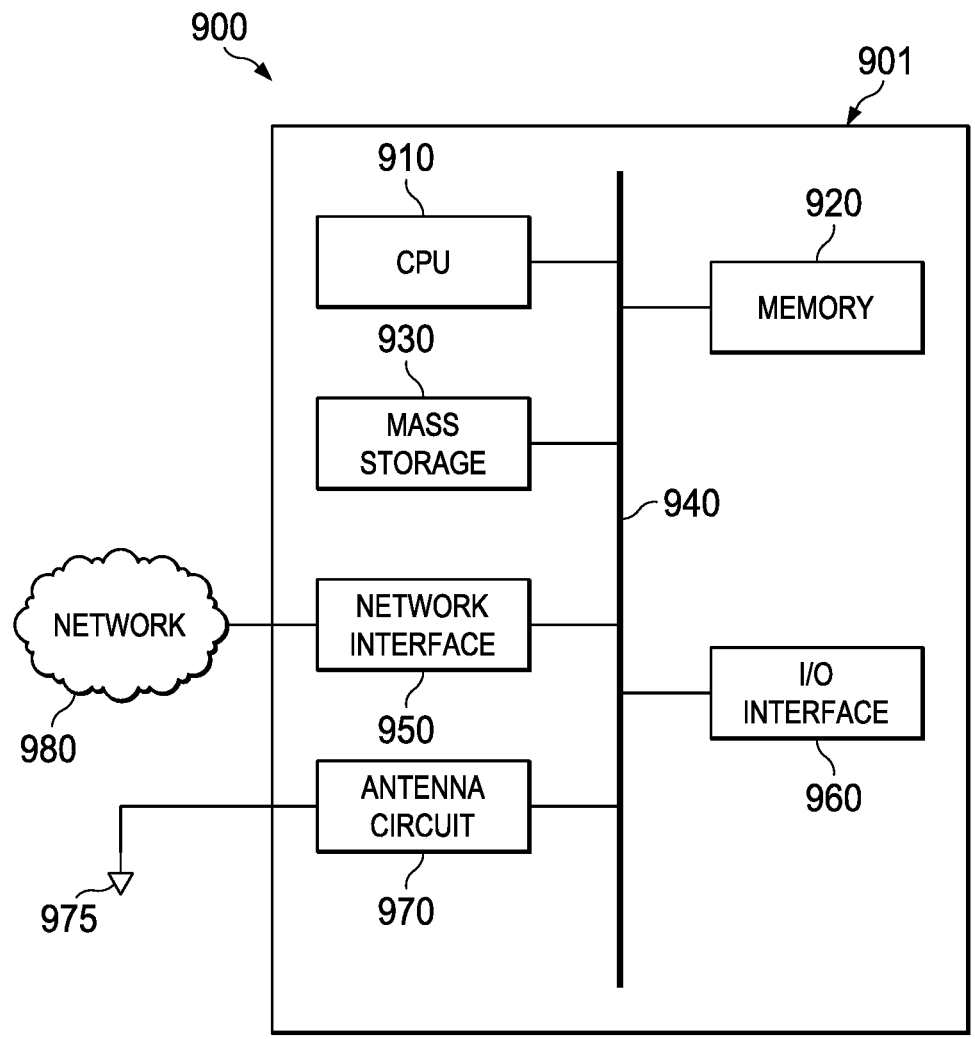

FIG. 9 is a block diagram of a processing system 900 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 900 may comprise a processing unit 901 equipped with one or more input/output devices, such as a speaker, microphone, mouse, touchscreen, keypad, keyboard, printer, display, and the like. The processing unit 901 may include a central processing unit (CPU) 910, memory 920, a mass storage device 930, a network interface 950, an I/O interface 960, and an antenna circuit 970 connected to a bus 940. The processing unit 901 also includes an antenna element 975 connected to the antenna circuit.

The bus 940 may be one or more of any type of several bus architectures including a memory bus or memory controller, a peripheral bus, video bus, or the like. The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs.

The mass storage device 930 may comprise any type of storage device configured to store data, programs, and other information and to make the data, programs, and other information accessible via the bus 940. The mass storage device 930 may comprise, for example, one or more of a solid state drive, hard disk drive, a magnetic disk drive, an optical disk drive, or the like.

The I/O interface 960 may provide interfaces to couple external input and output devices to the processing unit 901. The I/O interface 960 may include a video adapter. Examples of input and output devices may include a display coupled to the video adapter and a mouse/keyboard/printer coupled to the I/O interface. Other devices may be coupled to the processing unit 901 and additional or fewer interface cards may be utilized. For example, a serial interface such as Universal Serial Bus (USB) (not shown) may be used to provide an interface for a printer.

The antenna circuit 970 and antenna element 975 may allow the processing unit 901 to communicate with remote units via a network. In an embodiment, the antenna circuit 970 and antenna element 975 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 970 and antenna element 975 may also provide Bluetooth and/or WiFi connection to other devices.

The processing unit 901 may also include one or more network interfaces 950, which may comprise wired links, such as an Ethernet cable or the like, and/or wireless links to access nodes or different networks. The network interface 901 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

The following reference is related to subject matter of the present application. This references is incorporated herein by reference in its entirety:

[1] Arkko and Haverinen, IETF RFC 4187, Extensible Authentication Protocol Method for 3rd Generation Authentication and Key Agreement (EAP-AKA) (January 2006).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
   obtaining, by a user equipment (UE), a UE identifier;
   setting up, by the UE with a wireless network component, a packet data network (PDN) connection;
   receiving, by the UE, an extensible authentication protocol (EAP) message from an authentication, authorization, and accounting (AAA) server/proxy, the EAP message including an identifier of a link layer channel between the UE and a trusted WLAN access gateway (TWAG) that the AAA server/proxy obtained from the TWAG; and
   communicating, by the UE, with the TWAG over the link layer channel using wireless local area network (WLAN) control signaling protocol (WLCP).

2. The method of claim 1, wherein the UE identifier comprises a UE IP address.

3. The method of claim 1, wherein communicating with the TWAG over the link layer channel using the WLCP comprises sending a session management message over the link layer channel during an extensible authentication protocol (EAP) procedure.

4. The method of claim 3, wherein sending the session management message comprises one of:
   sending the session management message to a media access control (MAC) address received by the UE during the EAP procedure;
   sending the session management message to an IP address or an IP address with a port number received by the UE during the EAP procedure; or
   sending the session management message to the IP address or the IP address with a port number received during the EAP procedure as an IP layer destination address, and to the MAC address received during the EAP procedure as a MAC layer destination address.

5. The method of claim 3, wherein the session management message comprises at least one of a PDN connection management message, an attach message, a detach message, a handover message, or a Non-Seamless WLAN Offload (NSWO) establishing and release message.

6. The method of claim 1, wherein communicating with the TWAG over the link layer channel using the WLCP comprises receiving an identifier used to identify a point-to-point link between the UE and a serving TWAG that is associated with a specific PDN connection or a Non-Seamless WLAN Offload (NSWO) connection.

7. The method of claim 6, wherein the identifier used to identify the point-to-point link between the UE and the serving TWAG comprises a media access control (MAC) address of the TWAG.

8. The method of claim 7, further comprising using the MAC address of the TWAG for encapsulating user plane packets transported between the UE and the TWAG for a PDN connection or an NSWO connection.

9. The method of claim 6, wherein the TWAG uses a MAC address of the UE and the MAC address of the TWAG to identify the point-to-point link between the UE and the TWAG and match the point-to-point link with a tunnel to a PDN gateway (GW) or a Gateway General Packet Radio Service Support Node (GGSN) for the specific PDN connection.

10. The method of claim 1, wherein the link layer channel is an internet protocol (IP) layer channel.

11. The method of claim 1, further comprising sending, by the UE, a request for multi-connection mode to the TWAG.

12. The method of claim 1, further comprising sending, by the UE, a PDN connection request via the WLCP to the TWAG.

13. The method of claim 1, further comprising:
   receiving, by the UE, a media access control (MAC) address of the TWAG by one of using a dedicated Ethernet multicast address listened to by the TWAG, receiving a WLCP Init indication in response to the UE being successfully authenticated, and receiving an address of the TWAG in an EAP response.

14. The method of claim 1, wherein the EAP message comprises an EAP request.

15. The method of claim 1, wherein the identifier of the link layer channel comprises an internet protocol (IP) address of the TWAG.

16. The method of claim 1, wherein the identifier comprises one of a virtual local area network (VLAN) identifier (ID), an layer 2 (L2) generic routing encapsulation (GRE) key, and a sub-network access protocol (SNAP) header of the TWAG.

17. A user equipment (UE) comprising:
   a non-transitory memory storage comprising program instructions;
   one or more processors in communication with the non-transitory memory storage, the one or more processors executing the program instructions to:
   obtain a UE identifier;
   set up a packet data network (PDN) connection with a wireless network component;
   receive an extensible authentication protocol (EAP) message from an authentication, authorization, and accounting (AAA) server/proxy, the EAP message including an identifier of a link layer channel between the UE and a trusted WLAN access gateway (TWAG) that the AAA server/proxy obtained from the TWAG; and
   communicate with the TWAG over the link layer channel using wireless local area network (WLAN) control signaling protocol (WLCP).

18. The UE of claim 17, wherein the UE identifier comprises a UE IP address.

19. The UE of claim 17, wherein the one or more processors executing the program instructions to communicate with the TWAG over the link layer channel using the WLCP comprises the one or more processors further executing program instructions to send a session management message over the link layer channel during an extensible authentication protocol (EAP) procedure.

20. The UE of claim 19, wherein the one or more processors executing the program instructions to send the session management message comprises the one or more processors further executing program instructions to:
   send the session management message to a media access control (MAC) address received by the UE during the EAP procedure;
   send the session management message to an IP address or an IP address with a port number received by the UE during the EAP procedure; or
   send the session management message to the IP address or the IP address with a port number received during the EAP procedure as an IP layer destination address, and to the MAC address received during the EAP procedure as a MAC layer destination address.

21. The UE of claim 19, wherein the session management message comprises at least one of a PDN connection management message, an attach message, a detach message, a handover message, or a Non-Seamless WLAN Offload (NSWO) establishing and release message.

22. The UE of claim 17, wherein the one or more processors executing program instructions to communicate with the TWAG over the link layer channel using the WLCP comprises the one or more processors further executing program instructions to receive an identifier used to identify a point-to-point link between the UE and a serving TWAG that is associated with a specific PDN connection or a Non-Seamless WLAN Offload (NSWO) connection.

23. The UE of claim 22, wherein the identifier used to identify the point-to-point link between the UE and the serving TWAG comprises a media access control (MAC) address of the TWAG.

24. The UE of claim 23, wherein the one or more processors further execute program instructions to use the MAC address of the TWAG for encapsulating user plane packets transported between the UE and the TWAG for a PDN connection or an NSWO connection.

25. The UE of claim 22, wherein the TWAG uses a MAC address of the UE and the MAC address of the TWAG to identify the point-to-point link between the UE and the TWAG and match the point-to-point link with a tunnel to a PDN gateway (GW) or a Gateway General Packet Radio Service Support Node (GGSN) for the specific PDN connection.

26. The UE of claim 17, wherein the link layer channel is an internet protocol (IP) layer channel.

27. The UE of claim 17, wherein the one or more processors further execute program instructions to send a request for multi-connection mode to the TWAG.

28. The UE of claim 17, wherein the one or more processors further execute program instructions to send a PDN connection request via the WLCP to the TWAG.

29. The UE of claim 17, wherein the one or more processors further execute program instructions to:
receive a media access control (MAC) address of the TWAG by one of using a dedicated Ethernet multicast address listened to by the TWAG, receiving a WLCP Init indication in response to the UE being successfully authenticated, and receiving an address of the TWAG in an EAP response.

30. The UE of claim 17, wherein the EAP message comprises an EAP request.

31. The UE of claim 17, wherein the identifier of the link layer channel comprises an internet protocol (IP) address of the TWAG.

32. The UE of claim 17, wherein the identifier comprises one of a virtual local area network (VLAN) identifier (ID), an layer 2 (L2) generic routing encapsulation (GRE) key, and a sub-network access protocol (SNAP) header of the TWAG.

* * * * *